United States Patent
Putsch

[11] Patent Number: 6,071,462
[45] Date of Patent: Jun. 6, 2000

[54] COMPOUNDING INJECTION MOLDING COMBINED PROCESS

[75] Inventor: Peter Putsch, Nuremberg, Germany

[73] Assignee: Intrafico Intercontinental Trade & Finance Co. Establ., Vaduz, Liechtenstein

[21] Appl. No.: 08/232,854

[22] Filed: Apr. 22, 1994

Related U.S. Application Data

[63] Continuation of application No. 07/971,855, Jan. 8, 1993, abandoned.

[30] Foreign Application Priority Data

Jul. 9, 1990 [DE] Germany .............................. 40 21 922
Jul. 8, 1991 [WO] WIPO ..................... PCT/DE91/00564

[51] Int. Cl.$^7$ ................................................. B29C 45/70
[52] U.S. Cl. ................................ 264/328.14; 264/328.18; 264/328.19; 264/921
[58] Field of Search .............................. 264/37, 101, 102, 264/328.14, 328.17, 328.18, 328.19, 921; 425/217, 547, 551, 557, 558, 578, 580, 583, 584, 585, 587, 203, 205

[56] References Cited

U.S. PATENT DOCUMENTS

| | | |
|---|---|---|
| 2,382,655 | 8/1945 | Nichols . |
| 3,913,796 | 10/1975 | Aoki . |
| 4,591,467 | 5/1986 | Kopernicky . |
| 5,286,187 | 2/1994 | Niimi et al. ............................ 425/551 |

FOREIGN PATENT DOCUMENTS

| | | |
|---|---|---|
| 0357880 | 5/1989 | European Pat. Off. . |
| 2205406 | 5/1974 | France . |
| 52-7018 | 2/1977 | Japan .................................... 425/203 |
| WO8503027 | 7/1985 | WIPO . |

OTHER PUBLICATIONS

Frados, Joel, *Plastics Engineering Handbook*, 1976, pp. 83–94.

*Primary Examiner*—Jill L. Heitbrink
*Attorney, Agent, or Firm*—Jordan and Hamburg LLP

[57] ABSTRACT

A process is disclosed for recycling plastic materials. The previously sorted plastic material wastes are comminuted, mixed, melted and homogenized during a first step, and the raw materials thus recovered are immediately stocked in a storage chamber (12) or buffer reservoir, then supplied to an injection and moulding device (13). During their temporary storage, the raw materials are exposed if necessary to a regulated temperature.

10 Claims, 1 Drawing Sheet

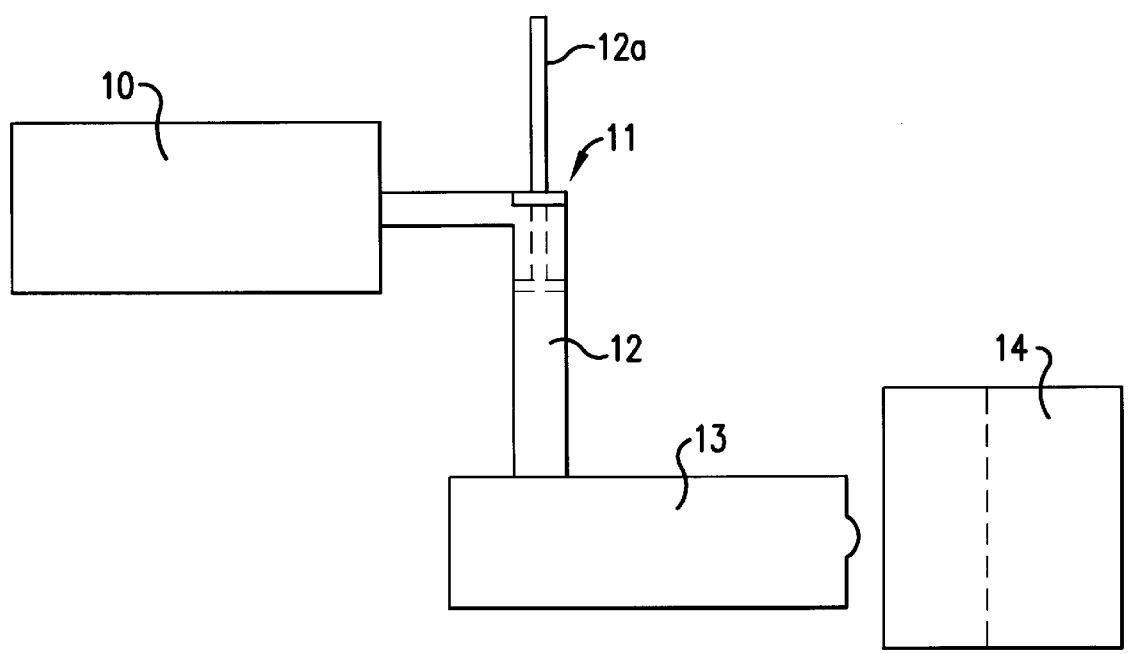

COMPOUNDING INJECTION MOLDING COMBINED PROCESS

This is a continuation, of application Ser. No. 07/971,855 filed Jan. 8, 1993 now abandoned.

FIELD OF INVENTION

The invention relates to a combined compounding-injection molding method for recycling plastic waste, in which the plastic waste is comminuted, mixed, melted and homogenized, and subsequently supplied to injection and molding equipment. The invention further relates to an apparatus for implementing this method.

BACKGROUND INFORMATION AND PRIOR ART

Such a method and such an apparatus are basically already known from the EP-06 321 742. In the case of the known apparatus, a stationary receiving vessel is provided, in the bottom region of which comminuting and mixing equipment, which can rotate about the axis of the vessel, and a casing opening as outlet for the granulate produced in the apparatus are disposed. From there, the plastic material is supplied to a two-stage screw conveyor and, if necessary, maintained at a particular temperature.

Such an apparatus neither ensures adequate mixing, in order to make possible the use of recycled material even for the manufacture of high-grade plastic products nor, because of the absence of the possibility of interim storage, does it permit the use of a plunger-type injection unit, which operates discontinuously.

From U.S. Pat. No. 2,382,655, a method and an apparatus for recycling plastic waste are known. In this case, the material is comminuted in an apparatus provided with knives and is subsequently supplied by a screw conveyor to an apparatus, in which it is processed further.

U.S. Pat. No. 4,591,467 already discloses a two-step mixing, heating and homogenizing of plastic material.

The German patent 960,854 discloses an injection molding machine with a heating injection cylinder, in which a constantly revolving screw is disposed, which conveys the pre-plasticized material into the pressure space of an extruder. This injection molding machine cannot be used in this way for recycled material, if for no other reason than that it cannot ensure adequate mixing of the components.

The German utility patent 1,847,990 also discloses an injection molding machine for thermoplastic materials with screw plastification. However, because of insufficient pre-mixing of the recycled components, this machine also cannot be used for a recycling method.

Plastics have gained increasing importance in all areas of everyday life, and also in the industrial sector.

Meanwhile, the disposal of parts produced from plastics increasingly is creating problems, since these parts, unlike natural products or parts derived from natural products, are not returned to the cycle of nature by decaying.

The significance of plastics is to be explained using the automobile as example. In a headlong development, plastics have meanwhile attained 10% by weight. Consideration of how this modern material could be used again did not keep pace with the headlong pace described previously. While steel, iron and aluminum, which constitute about 75% of the vehicle mass, can be largely used again, plastics are a burden on waste disposal sites. Furthermore, the danger exists that the plastic portions, because of the relationships described above, will become afflicted with a negative image in the eyes of the general public and, with that, lose acceptance by the people.

There is finally the danger that these modern materials will possibly have to be replaced for political reasons, although the engineers are not readily prepared to do without these materials, which moreover can hardly be replaced in the case of many components.

Recycling plastics therefore is the dictate of the hour. The way to recycling plastics passes through the steps of dismantling and pre-sorting, so that the plastics are obtained largely by type. For example, a large automobile plant in Wackersdorf is planning a dismantling plant. This is being done in the knowledge that, without reusing the plastics, there will be a greater need to resort to the possibility of burning of the plastic waste, which is, however, undesirable for environmental-political reasons.

Within the framework of plastics recycling, the largest garbage sorting plant in Europe, which will be designed to handle approximately 100,000 tons of garbage annually and in which the garbage components are to be separated into glass, metal, plastics, etc., is to be set up in Berlin. The pre-sorted raw materials are then made useful once again as "secondary raw materials".

Particularly in the packaging industry are there large amounts of plastic waste, which consists mainly of plastic material, which has had only a single heat treatment. This plastic material is of high quality, since the high-performance processing machines in the packaging industry can be operated only with such material.

The desire to recycle plastics has actually existed already for a long time. Up to now, however, all the projects tackled have failed because of the high costs of the processing. The recycled material, processed by previously conventional methods, is almost as expensive as new material. This is understandably a bad starting situation for the absolutely essential recycling.

Usually, the material, which is to be processed again, is collected, sorted, milled, extruded in an intermediate step and granulated, as well as subsequently, during the processing, melted down again and once more converted into the desired shapes. The renewed melting process alone causes considerable costs, because of the high energy consumption.

Adequate pre-sorting initially is a sufficient prerequisite for recycling plastics. The intensity of the pre-sorting selected depends on the purpose, for which the recycled material is to be used later on. Moreover, adequate mixing of the pre-sorted material is required, since the material cannot be regarded as homogeneous in spite of having been pre-sorted; the material frequently is not even all of one type of plastic. In the crude material, which consists largely of polyethylene, larger portions of polypropylene (such as seals, plugs, bottle tops), polystyrene, polyester, etc. are contained.

Only good homogenization of the raw material creates the conditions for recycling the plastics later on. It should, after all, also be possible to produce high-quality finished parts from the "secondary raw material", which possibly require admixtures of talc, glass fibers, general reinforcing agents, stabilizers and pigments or dyes.

OBJECT OF THE INVENTION

It is an object of the invention to provide a method and an apparatus for implementing the method, which permit perfectly adequate, new plastic material to be produced from recycled plastics.

SUMMARY OF THE INVENTION

Pursuant to this object, and others which will become apparent hereafter, one aspect of the present invention resides in a method for recycling plastic waste in which the plastic is comminuted, mixed, heated, melted and homogenized by kneading, and is then intermediately stored at a controlled temperature. After storage, the kneaded plastic is supplied to injection and molding equipment.

In a further embodiment, the inventive method intermediately stores the kneaded plastic under considerable pressure.

In yet another embodiment, the kneaded plastic is degassed during the intermediate storage.

Another aspect of the invention resides in an apparatus for recycling plastic, which apparatus includes a kneader that comminutes, mixes, heats, melts and homogenizes the plastic, a storage chamber for intermediately storing the kneaded plastic at a controlled temperature, and means for injecting and molding the plastic. The storage chamber being connected between the kneader and the injecting and molding means.

In another embodiment of the inventive apparatus, degassing means are provided for degassing the plastic. The degassing means can be provided in either the kneader or the storage chamber.

A further embodiment provides a temperature controlled shaft arranged so that the plastic leaving the kneader falls freely into the shaft.

In still another embodiment, a deflector connects the kneader to the storage chamber, and the degassing means is arranged in the deflector.

The invention will be described in further detail below in connection with the accompanying drawings.

BRIEF DESCRIPTION OF THE DRAWINGS

The single feature is a schematic representation of the invention.

DESCRIPTION OF THE PREFERRED EMBODIMENTS

To begin with, the crude material is, if necessary, adequately kneaded and melted in compounding equipment 10. The mixing process must be of such an intensity, that adequate homogeneity of the raw material, so processed, is ensured. For this purpose, a kneader is preferably used. This is understood to be equipment (a homogenizer), which serves as a homogenizer and mixes different materials or plastics with one another and/or with additives. This is achieved mainly through mechanical agitation (co-currently, countercurrently, axally), for example, through rotors or screws, up to adequate mixing and plasticization. If necessary, additional heating can also be provided.

Only when adequate mixing and plasticization is ensured, can the melt of the crude material be passed on to a deflector 11 and a buffer reservoir or storage space 12, the temperature of which should also be controlled, for example, by heated ducts disposed at the top, at the bottom and/or at the sides.

From the deflector 11 and the temperature-controlled buffer reservoir or storage space 12, the molten raw material then reaches a known injection unit 13. This can be a conventional screw injection unit with any length to diameter ratio, or also plunger type injection molding unit.

Blow molding equipment can also be used. Such equipment includes continuous extrusion blow molding equipment, blow molding equipment with melt storage heads (the extruder also operates continuously in a reservoir), blow molding equipment with reciprocating screw units (similar to an injection molding machine—discontinuous) and injection blow molding equipment (parison is injection molded and subsequently blown—discontinuous).

The feed section of the injection unit (injection molding) or of the extruder (blowing equipment) and the screw must be designed so that hot, plasticized material can be drawn in. A sufficiently large opening and a sufficiently deep spiral must therefore be present. If necessary, a stopper (piston/pusher) can also be provided.

The sizes of the individual components, namely the compounding unit 10, the deflector 11, the storage space 12 and the injection unit 13, must be matched to one another so that a quasi continuous flow through this total unit consisting of the components can be assured. Slight, brief differences in the material flow from component to component are compensated for by the storage space 12 (buffer reservoir). The storage space 12 or buffer reservoir is, however, also required in order to bring about the smooth transition from the compounding equipment, which largely works continuously, to the injection unit 13, which operates intermittently. On a long term basis, the material flows of the individual components are matched and monitored by means of an appropriate central control unit. The temperature can also be adjusted and monitored by such a control system.

The apparatus described above is not only suitable for recycling waste, but can also be used for the simultaneous compounding and injection of mixtures of new materials, for example, for compounding polypropylene with talc or glass fibers, nylon with glass fibers, ABS with dyes and pigments, etc.

Plastics and plastic mixtures can be mixed with one another (blends). However, plastics or plastic mixtures can also be provided with additives or fillers (compounds) and processed into finished parts.

A very appreciable advantage in the recycling is the fact that the second melting process—such as that after the previously customary pretreatment of the raw material to be processed and its granulation—is avoided. On the one hand, this saves energy costs in a worthwhile order of magnitude, on the other, it is easy on the material.

In the case of viscous materials, it may be necessary to build up pressure in the storage space 12 of the buffer reservoir. This can usually be done by means of a piston, etc which is known in the art.

The compounding unit 10 preferably is constructed as kneader; it can, however, also be constructed as a double screw. If adequate mixing is ensured in the concrete case for the respective material, a single screw can also be provided, by way of exception, in the compounding unit. The compounding unit can also be provided with de-gassing equipment.

As storage area 12 (buffer reservoir), a heat-controlled shaft comes into consideration primarily. Here also, de-gassing equipment can be provided. The storage space 12 can be constructed for the free fall of the kneaded mass or be equipped with forced delivery, particularly with a piston; if necessary, the storage space 12 can also be designed for high pressures.

The injection unit 13, which is connected to the storage space 12, largely corresponds to that of the state of the art. Screw injection units or piston injection units can be used.

What is claimed is:

1. A method for molding a product from recycled plastic which has been presorted, comprising the steps of:
   kneading the recycled presorted plastic substantially continuously so that it is simultaneously comminuted, mixed, heated, melted and homogenized;
   passing the kneaded plastic to an intermediate buffer reservoir:
   intermediately storing the kneaded plastic at a controlled temperature in said intermediate buffer reservoir;
   supplying the kneaded plastic, after said intermediate storage, to injection molding equipment;
   molding said kneaded plastic into a product in said injection molding equipment, said molding step being effected intermittently; and
   effecting quasi-continuous flow of plastic material from said kneading step, said passing step, said intermediate storing step, and said supplying step with said intermediate storing step compensating for the difference in the plastic material flowing from step to step.

2. A method as defined in claim 1, including degassing the kneaded plastic during the immediate storing.

3. A method according to claim 1 wherein said passing and intermediate storing steps comprise effecting free fall of the kneaded mass of plastic down a vertical shaft to said injection molding equipment.

4. A method for molding a plastic product from recycled waste plastic material which has been presorted comprising the steps of:
   simultaneously and continuously comminuting, mixing, heating, melting and homogenizing said presorted, recycled waste plastic material in a kneader;
   continuously passing said simultaneously and continuously comminuted, mixed, heated, melted and homogenized plastic material to an intermediate buffer reservoir;
   intermediately and temporarily storing said simultaneously and continuously comminuted, mixed, heated, melted and homogenized plastic material in said intermediate buffer reservoir;
   controlling the temperature of said simultaneously and continuously comminuted, mixed, heated, melted and homogenized plastic material in said intermediate buffer reservoir;
   intermittently supplying said simultaneously and continuously comminuted, mixed, heated, melted and homogenized plastic material from said intermediate buffer reservoir to injection molding equipment;
   intermittently molding said simultaneously and continuously comminuted, mixed, heated, melted and homogenized plastic material into a plastic product in said injection molding equipment; and
   effecting quasi-continuous flow of said simultaneously and continuously comminuted, mixed, heated, melted and homogenized plastic material from said simultaneously and continuously comminuting, mixing, heating, melting and homogenizing step, to said continuously passing step, to said intermediately and temporarily storing step, to said intermittently supplying step and to said intermittently molding step with said intermediately and temporarily storing step compensating for the difference in the flow of said plastic material between said continuously passing step and said intermittently molding step.

5. A method according to claim 4 wherein said continuously passing step comprises effecting free fall of said simultaneously and continuously comminuted, mixed, heated, melted and homogenized plastic material down a vertical space in said intermediate buffer reservoir.

6. A method according to claim 4 further comprising adding an admixture to said simultaneously and continuously comminuted, mixed, heated, melted and homogenized plastic material, said admixture being selected from the group consisting of talc, glass fibers, reinforcing agents, stabilizers, pigments and dies.

7. A method according to claim 6 further comprising simultaneously and continuously mixing, heating, and homogenizing said admixture in said kneader while simultaneously and continuously comminuting, mixing, heating, melting and homogenizing said plastic material in said kneader.

8. A method for molding a plastic product comprising:
   providing a recycled waste plastic material;
   presorting said recycled waste plastic material;
   simultaneously and continuously comminuting, mixing, heating, melting and homogenizing said presorted, recycled waste plastic material in a kneader;
   continuously passing said simultaneously and continuously comminuted, mixed, heated, melted and homogenized plastic material to an intermediate buffer reservoir;
   intermediately and temporarily storing said simultaneously and continuously comminuted, mixed, heated, melted and homogenized plastic material in said intermediate buffer reservoir;
   controlling the temperature of said simultaneously and continuously comminuted, mixed, heated, melted and homogenized plastic material in said intermediate buffer reservoir;
   intermittently supplying said simultaneously and continuously comminuted, mixed, heated, melted and homogenized plastic material from said intermediate buffer reservoir to injection molding equipment;
   intermittently molding said simultaneously and continuously comminuted, mixed, heated, melted and homogenized plastic material into a plastic product in said injection molding equipment; and
   effecting quasi-continuous flow of said simultaneously and continuously comminuted, mixed, heated, melted and homogenized plastic material from said simultaneously and continuously comminuting, mixing, heating, melting and homogenizing step, to said continuously passing step, to said intermediately and temporarily storing step, to said intermittently supplying step and to said intermittently molding step with said intermediately and temporarily storing step compensating for the difference in the flow of said plastic material between said continuously passing step and said intermittently molding step.

9. A method according to claim 8 wherein said recycled waste plastic material is selected from the group consisting of polyethylene, polypropylene, polystyrene and polyester.

10. A method according to claim 8 wherein said recycled waste plastic material is selected from the group consisting of seals, plugs and bottle tops.

* * * * *